July 23, 1957 D. H. HICKEY 2,799,894

DIP ERASING TANK FOR THERMOPLASTIC DISK RECORDS

Filed June 17, 1955 3 Sheets-Sheet 1

INVENTOR.
DAVID H. HICKEY
BY
H. G. Manning
ATTORNEY

INVENTOR.
DAVID H. HICKEY
BY
H. G. Manning
ATTORNEY

July 23, 1957 D. H. HICKEY 2,799,894

DIP ERASING TANK FOR THERMOPLASTIC DISK RECORDS

Filed June 17, 1955 3 Sheets-Sheet 3

INVENTOR.
DAVID H. HICKEY
BY
H. G. Manning
ATTORNEY

United States Patent Office 2,799,894

Patented July 23, 1957

2,799,894

DIP ERASING TANK FOR THERMOPLASTIC DISK RECORDS

David H. Hickey, Manchester, Conn., assignor to The SoundScriber Corporation, New Haven, Conn., a corporation of Connecticut Application June 17, 1955, Serial No. 516,175

5 Claims. (Cl. 18—1)

This invention relates to the reprocessing of used thermoplastic phonograph record disks, and more particularly to the restoration of such disks into condition for rerecording.

The apparatus and process herein disclosed constitute improvements in the several inventions disclosed in Patent No. 2,539,717, to Donald F. Balmer, issued January 30, 1951, entitled Reprocessing Phonograph Record Disks, Patent No. 2,589,185, to Nils T. Almquist and Anthony C. De Napoli, Jr., issued March 11, 1952, entitled Machine for Reprocessing Phonograph Record Disks, and a co-pending application Serial No. 418,407, filed by Henry Allan Sherwood March 24, 1954, assigned to a common assignee, The SoundScriber Corporation of New Haven, Connecticut, entitled Process and Apparatus for Erasing Record Disks to Remove Sound Tracks and Background Noises, and the present inventions pertain to the restoration of record disks of thin plastic material in which a sound recording groove has been previously embossed and indented, and in which the recording operation has produced deformations and strains in the material without breaking or cutting the surface thereof.

The plastic material used for disks of this type may be, for example "Vinylite" which is a vinyl resin material, such as a copolymer of vinyl chloride and vinyl acetate, which under normal temperature conditions will permanently retain a record groove which has been indented therein. It has been found that when such disks are heated above a certain critical temperature, which is well below the melting point, all strains and stresses in the material will be relieved, so that the embossed grooves will disappear and both opposite surfaces of the disk will regain substantially the original smooth and polished characteristics which they had before the grooves were produced therein.

Accordingly, one object of this invention is to provide an apparatus for reprocessing used phonograph record disks which includes means for heating such a disk by intimate contact with a heated liquid.

Another object is to provide an apparatus of the above nature which includes means for obliterating record grooves from a phonograph record member, without removing any of the material thereof.

Another object is to provide an apparatus of the above nature which includes means for obliterating record grooves from both faces of a disk simultaneously.

A further object of the invention is to provide apparatus of the above nature for reprocessing thermoplastic record disks by relieving strains in the surface of the disk caused by the impressing of sound recording grooves therein, and thus to restore the disk to its original condition.

A still further object of the invention is to provide an improved process for obliterating sound recording grooves impressed in a thermoplastic disk by transfer of heat by conduction to said disk by intimate contact with a liquid which is chemically inert with respect to said disk.

Another object is to provide an improved process for restoring used thermoplastic disk sound records by immersing said records in a heated liquid to relieve strains in the surface of said records prior to the operation of restoring their planiform condition by centrifugal rotation.

A still further object is to provide an apparatus of the above nature which will be simple in construction, inexpensive to manufatcture, easy to install and manipulate, compact, and very efficient and durable in use.

With these and other objects in view, there has been illustrated on the accompanying drawings, one form in which the invention may conveniently be embodied in practice.

Figure 1:
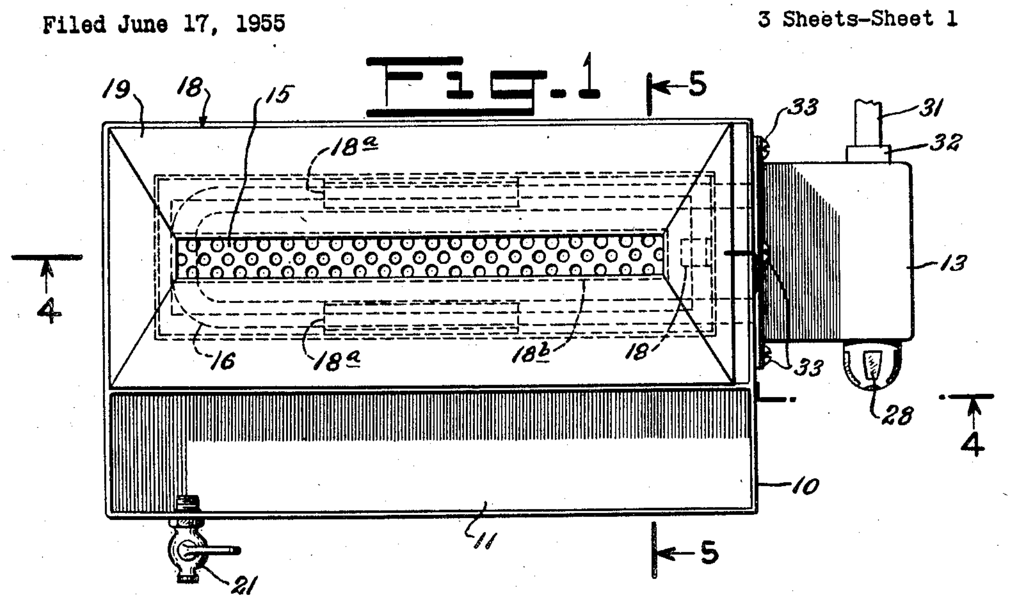
Fig. 1 represents a plan view of one form of the improved apparatus for reprocessing record disks embodying the present invention.

Referring now to the drawings in which like reference numerals denote corresponding parts throughout the several views, the numerals 10 indicates an outer casing which is subdivided into a compartment 11 adapted to contain a cooling medium such as water, and a compartment 12 adapted to contain a heat transferring medium, such as ethylene glycol, or Prestone.

A control box 13 is attached to one end of the outer casing 10, and contains the electrical connections for a thermostatic switch 14 to control the temperature of the fluid in the compartment 12. A perforated shelf 15 is provided in the compartment 12 above the level of a pair of U-shaped electric immersion heating elements 16 and 17, so as to permit circulation of the liquid contained therein and prevent the record disk R, partially submerged in the liquid, from coming into direct contact with the heating elements 16 and 17.

Figure 5:
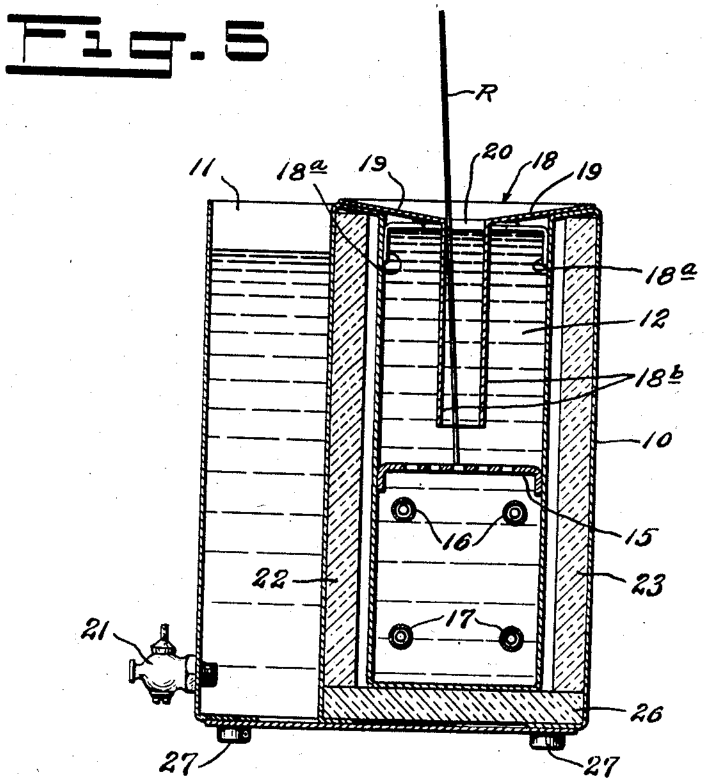
Fig. 5 is a cross-sectional elevation taken on the line 5—5 of Fig. 1.
Figure 6:
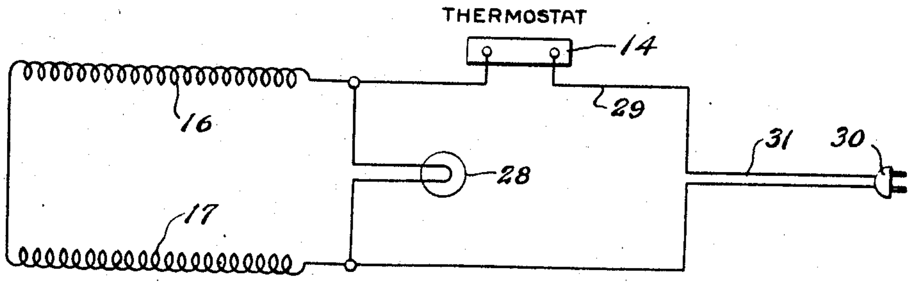
Fig. 6 is a schematic diagram of the electrical circuits and control mechanism.

A removable cover 18 comprises four downwardly and centrally converging surfaces 19 which rest on the top of the compartment 12, said surfaces 19 having depending flanges **18*a* on their undersides to keep the cover in position. The converging surfaces 19 terminate centrally in four vertical guide walls 18*b* defining a slotted opening 20 in the cover 18** (Fig. 5).

The compartment 11 is provided with a drain plug 21 to permit removal of the cooling medium whenever desired. The compartment 12 is provided with a pair of thick insulated side walls 22 and 23, thick end walls 24 and 25, and a thick insulated bottom wall 26 to minimize loss of heat from the liquid contained therein, and to prevent transfer of heat to the cooling liquid in compartment 11. The outer casing is supported on rubber feet 27.

The electrical circuit includes the heating elements 16 and 17 which are connected in series and a pilot lamp 28 connected in parallel and controlled by the thermostatic switch 14, connected by wiring 29 contained in the control box 13. A wall plug 30, attached to an electrical cable 31 supplies current to the apparatus. The cable 31 is mounted in a grommet 32 where it enters the control box 13, and the control box itself is attached to the casing 10 by self-tapping screws 33, to allow its removal for inspection of the internal electrical connections.

*Operation*

In operation, the compartment 11 will be filled with a suitable cooling medium, such as water, and the compartment 12 will be filled with any suitable high boiling point liquid which is chemically inert with respect to the material forming the disks to be reprocessed, and which may be heated to a temperature sufficient to cause plastic flow in said material, but without causing it to melt.

When the wall plug 30 is connected to a suitable tric power outlet, the thermostatic switch 14 will cause current to flow through the heating elements 16 and 17 and the pilot lamp 28 until the temperature of the liquid in the compartment 12 has been raised to the desired level, after which the thermostatic switch 14 will maintain the liquid at this temperature. In the practice of the present invention, it has been found that with record disks of the vinyl resin type, the best results are secured when the temperature of the liquid in the heating compartment 12 is maintained within the limits of 260 to 270 degrees Fahrenheit, although it will be understood that the temperature range may be varied in accordance with the materials used.

Figure 2:
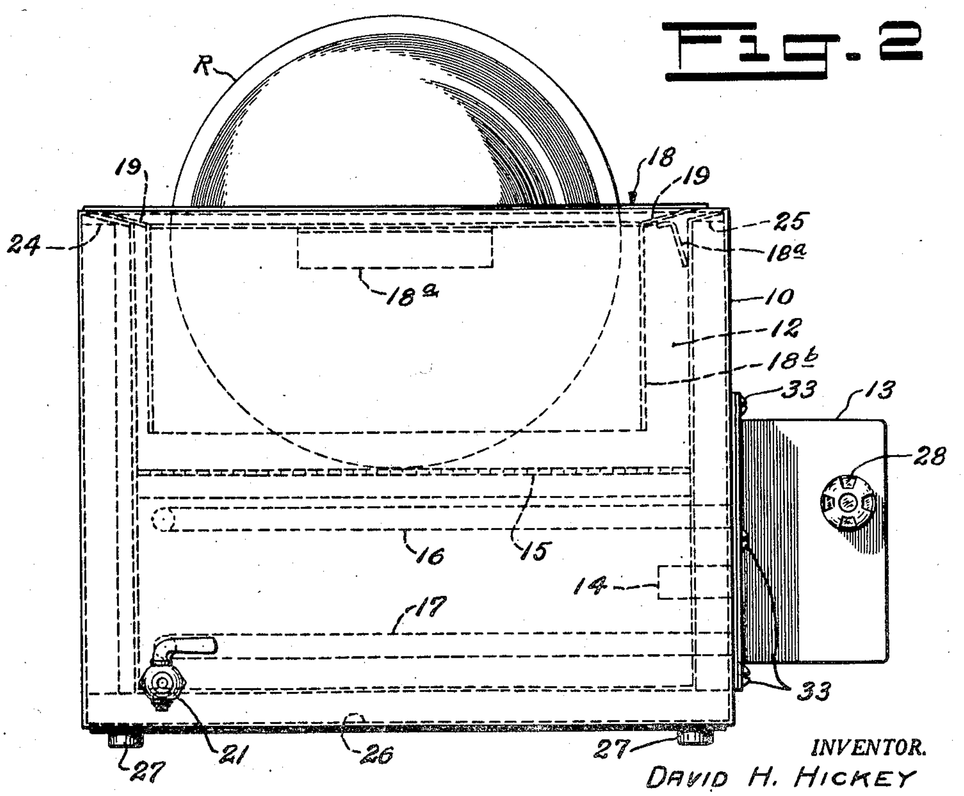
Fig. 2 is a side elevation of the same.
Figure 3:
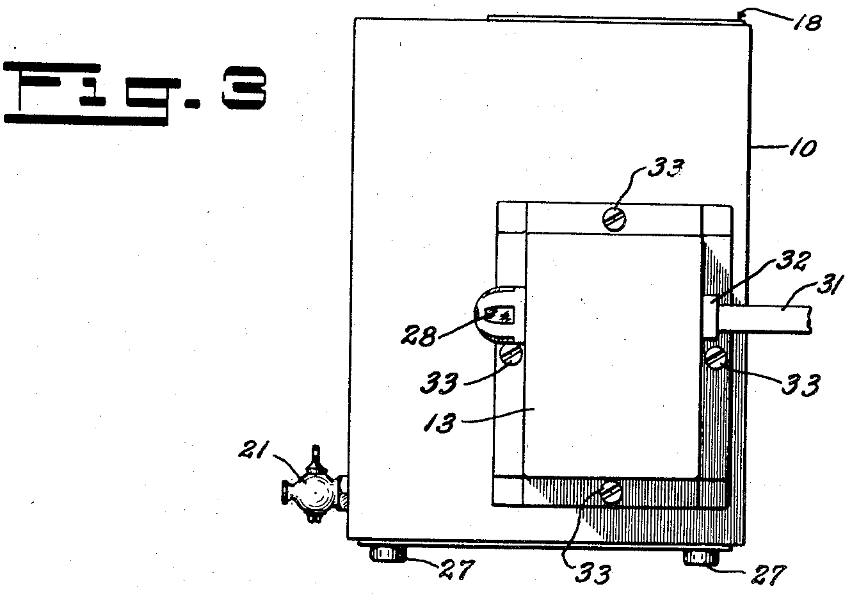
Fig. 3 is a front elevation of the same.
Figure 4:
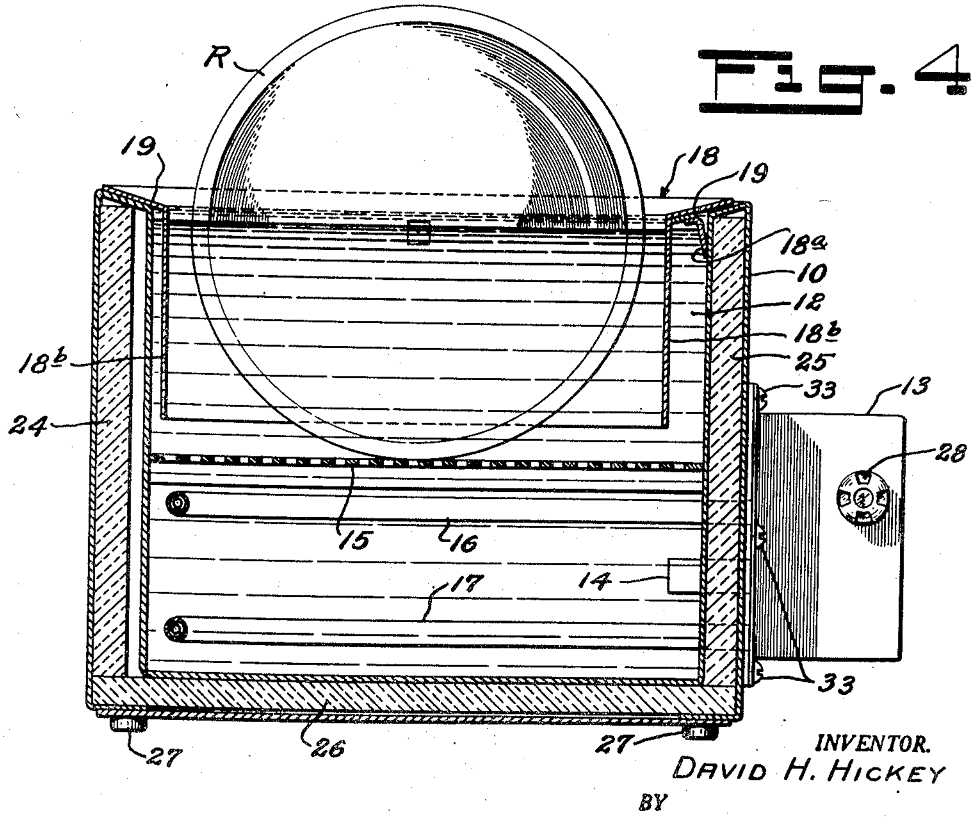
Fig. 4 is a cross-sectional elevation taken on the line 4—4 of Fig. 1.

When the heating liquid in the compartment 12 has reached the predetermined temperature, the pilot lamp 28 will be turned off by automatic operation of the switch 14, and the apparatus will then be ready for use. A used record disk R may then be manually inserted through the slotted opening 20 in the cover 18 and partially immersed in the liquid as shown in Figs. 2, 4, and 5, during which operation the disk R will be heated to such a degree that the stresses and strains developed during the impressing of the sound grooves therein will be relieved, and the lower surface of the disk will return to its original smooth condition, although the disk as a whole will be limp and warped to some degree.

Having completed this step in the process, the disk R will be removed from the liquid in the compartment 12, and quickly immersed in the cooling medium in the compartment 11 to reduce the temperature of the disk and permit it to regain its inherent stiffness. At this stage, the disk will be wrinkled and warped, although the surfaces will be smooth and free from grooves and other markings. The disk will then be inverted and again partially immersed in the heated liquid to remove the grooves from the opposite half of the record from that originally processed, after which it will be immersed in the cooling liquid.

To complete the restoration of the record disk to its original planiform condition, it is desirable to place it on a rotating mandrel and to subject it to the influence of centrifugal force, and the action of moderate heat, as disclosed in the above-mentioned Patents Nos. 2,539,717 and 2,589,185, respectively, and the co-pending application of Sherwood.

One advantage of the invention herein disclosed, is that it enables the application of heat to a disk being reprocessed to be accurately controlled by virtue of the fact that the transfer of heat from the source to the disk is accomplished through conduction of the heat by a liquid medium, the temperature of which may be kept constant, and in which the disk is immersed for direct contact therewith.

Another advantage of the present invention is that it will enable used thermoplastic phonograph record disks to be quickly and easily restored to their original condition without the removal of any material from the surface of said disks.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In an apparatus for reprocessing thermoplastic sound recording disks, the combination including an outer casing, a dividing wall within said casing subdividing said casing into a first compartment adapted to contain liquid for heating a recording disk by immersion therein, to remove sound tracks therefrom and a second compartment adapted to contain liquid for subsequently cooling said disk by immersion therein, said first compartment being provided with a heat-insulating partition, a liquid container in said first compartment, a source of heat in said container for the heating liquid, and baffle means in said container above said heat source to permit circulation of said heating liquid, said baffle means being operable as a bottom abutment to prevent direct contact between said source of heat and a disk immersed in said heating liquid.

2. In an apparatus for reprocessing thermoplastic sound recording disks the combination including an open compartment to contain liquid for heating a recording disk by immersion therein, a removable cover for said compartment having a central elongated opening operative to edgewisely receive a disk to be immersed in the liquid contained in said compartment, said cover having a pair of disk guide walls depending from the elongated edges of said elongated opening, a perforated shelf below said guide walls for limiting downward motion of a disk received in said opening, and a source of heat for said liquid in said compartment below said perforated shelf.

3. In an apparatus for reprocessing thermoplastic sound recording disks wherein said disks are to be immersed in an open compartment containing liquid heated to temperatures sufficient to cause plastic flow of the material comprising said disk, the combination including an elongated rectangular cover for a compartment containing said heated liquid having a centrally positioned slotted opening extending lengthwise of the cover through which a disk may be passed edgewisely to be immersed in said liquid when said cover is in place on the top of said compartment, the surfaces of said cover surrounding said slotted opening being flat and downwardly convergently inclined toward said opening on all sides, and a continuous planar vertical guide wall surface depending below said convergent surfaces extending around the periphery of said slotted opening.

4. An apparatus as defined in claim 3, wherein downwardly projecting flanges are provided on the underside of said convergent surfaces to prevent lateral displacement of said cover.

5. In an apparatus for reprocessing thermoplastic sound recording disks, the combination including an outer casing, a dividing wall within said casing subdividing said casing into a first compartment to contain heating liquid and a second compartment adapted to contain cooling liquid, an electric immersion heating element near the bottom of said first compartment, a pair of horizontally spaced vertical guide members extending downwardly from the top of said first compartment between which guide members a disk to be reprocessed by immersion in said heated liquid may be received, and baffle means in said first compartment and above said electric heating element operative as a stop to prevent direct contact between the bottom edge of a disk and said electric heating element but permitting circulation of liquid in said first compartment.

References Cited in the file of this patent

UNITED STATES PATENTS

| | | |
|---|---|---|
| 388,923 | Smith et al. | Sept. 4, 1888 |
| 1,106,634 | Detwiler | Aug. 11, 1914 |
| 1,115,403 | Cseh | Oct. 27, 1914 |
| 1,344,326 | Williams | June 22, 1920 |
| 1,380,929 | Ruebsamen | June 7, 1929 |
| 1,906,444 | Bixby | May 2, 1933 |
| 2,235,250 | Bingham et al. | Mar. 18, 1941 |
| 2,299,053 | Ferris | Oct. 13, 1942 |
| 2,375,871 | Reifenberg | May 15, 1945 |
| 2,430,473 | Main | Nov. 11, 1947 |
| 2,467,749 | Hodsdon | Apr. 19, 1949 |
| 2,511,717 | Killian | June 13, 1950 |
| 2,653,214 | Shaw | Sept. 22, 1953 |
| 2,731,668 | Miner | Jan. 24, 1956 |